(12) United States Patent
Kim et al.

(10) Patent No.: US 12,545,300 B2
(45) Date of Patent: Feb. 10, 2026

(54) SAFE FOOTHOLD APPARATUS FOR PLATFORM

(71) Applicant: HYUNDAI MOVE-X CO., LTD., Seoul (KR)

(72) Inventors: Seo Jun Kim, Gyeonggi-do (KR); Sung Jun Yun, Incheon (KR)

(73) Assignee: HYUNDAI MOVE-X CO., LTD., Seoul (KR)

( * ) Notice: Subject to any disclaimer, the term of this patent is extended or adjusted under 35 U.S.C. 154(b) by 593 days.

(21) Appl. No.: 18/009,176

(22) PCT Filed: Apr. 13, 2021

(86) PCT No.: PCT/KR2021/004652
§ 371 (c)(1),
(2) Date: Dec. 8, 2022

(87) PCT Pub. No.: WO2021/251607
PCT Pub. Date: Dec. 16, 2021

(65) Prior Publication Data
US 2023/0234619 A1    Jul. 27, 2023

(30) Foreign Application Priority Data
Jun. 9, 2020    (KR) .......................... 10-2020-0069812

(51) Int. Cl.
*B61B 1/02*    (2006.01)
*E01F 1/00*    (2006.01)
(Continued)

(52) U.S. Cl.
CPC ................. *B61B 1/02* (2013.01); *E01F 1/00* (2013.01); *F16H 1/16* (2013.01); *G01B 7/02* (2013.01); *G01L 5/161* (2013.01)

(58) Field of Classification Search
CPC ... B61B 1/02; B60R 3/02; B61D 23/02; E01F 1/00
(Continued)

(56) References Cited

U.S. PATENT DOCUMENTS 5,257,614 A * 11/1993 Sullivan ................. F41B 11/00
124/73
7,669,742 B2 * 3/2010 Rush .................... F41C 33/0236
248/316.1
(Continued)

FOREIGN PATENT DOCUMENTS

| CN | 104386068 A | * | 3/2015 | ............... B61B 1/02 |
| CN | 112622938 A | * | 4/2021 | ............... B08B 3/02 |

(Continued)

OTHER PUBLICATIONS

International Search Report for PCT/KR2021/004652 mailed on Aug. 25, 2021 and its English Translation from WIPO (now published as WO 2021/251607).
(Continued)

*Primary Examiner* — Troy Chambers
(74) *Attorney, Agent, or Firm* — Ladas & Parry, LLP

(57) ABSTRACT

The present disclosure relates to a safe foothold apparatus for a platform, wherein a foothold plate protrudes from and is retracted into the platform by moving along a curved rotational route so that the foothold plate is re-retracted into the platform safely due to the operation structure even when a collision occurs between a train and the foothold plate in a protrusion state. Therefore, the present invention can prevent the foothold plate and the train from being damaged, thereby establishing safer boarding/alighting environment and stably maintaining the operational state of the foothold plate by using a frictional contact module even in an emergency situation. Accordingly, the present invention can improve safety through a simple structure, facilitate the (Continued)

manufacturing and establishment work by simplifying a structure of a manual operation module, reduce the size of a whole apparatus, and far enhance the operational stability.

12 Claims, 6 Drawing Sheets

(51) Int. Cl.
*F16H 1/16* (2006.01)
*G01B 7/02* (2006.01)
*G01L 5/161* (2020.01)

(58) Field of Classification Search
USPC .......................... 248/316.7; 134/31; 104/31
See application file for complete search history.

(56) References Cited

U.S. PATENT DOCUMENTS

| | | | | |
|---|---|---|---|---|
| 9,598,090 | B1 * | 3/2017 | Maysonet | ................ B61B 1/02 |
| 10,800,435 | B2 * | 10/2020 | Shi | ............................ B61B 1/02 |
| 2001/0042489 | A1 * | 11/2001 | Yamaguchi | ............... B61B 1/02 |
| | | | | 104/30 |
| 2010/0043664 | A1 * | 2/2010 | Winkelmann | ......... B61D 23/00 |
| | | | | 104/31 |
| 2010/0058949 | A1 * | 3/2010 | Lomberty | ................ B61B 1/02 |
| | | | | 104/31 |
| 2012/0167425 | A1 * | 7/2012 | Buschow | .................. F41A 3/86 |
| | | | | 42/14 |

FOREIGN PATENT DOCUMENTS

| | | | | |
|---|---|---|---|---|
| ES | 2575586 | A2 * | 6/2016 | ............... B61B 1/02 |
| JP | 2001-328529 | | 11/2001 | |
| JP | 2015-020489 | | 2/2015 | |
| KR | 10-2009-0063191 | | 6/2009 | |
| KR | 10-0918674 | | 9/2009 | |
| KR | 100929482 | B1 * | 12/2009 | ............... B61B 1/02 |
| KR | 10-2012-0139973 | | 12/2012 | |
| WO | WO-2010027239 | A2 * | 3/2010 | ............... B61B 1/02 |
| WO | WO-2020177160 | A1 * | 9/2020 | ............... B61B 1/02 |

OTHER PUBLICATIONS

Written Opinion of the International Searching Authority for PCT/KR2021/004652 mailed on Aug. 25, 2021 and its English Translation by Google Translate (now published as WO 2021/251607).

* cited by examiner

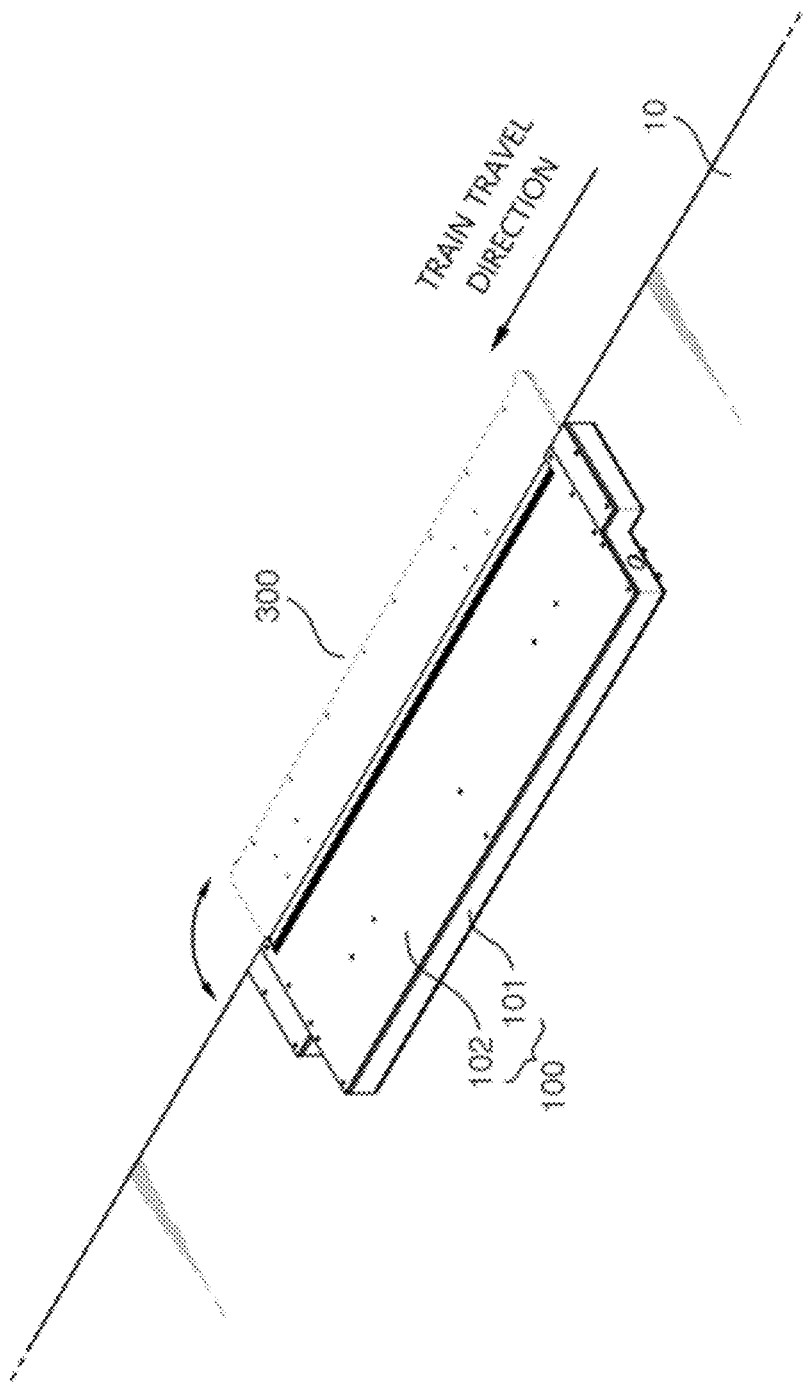
[FIG.1]

[FIG.2]
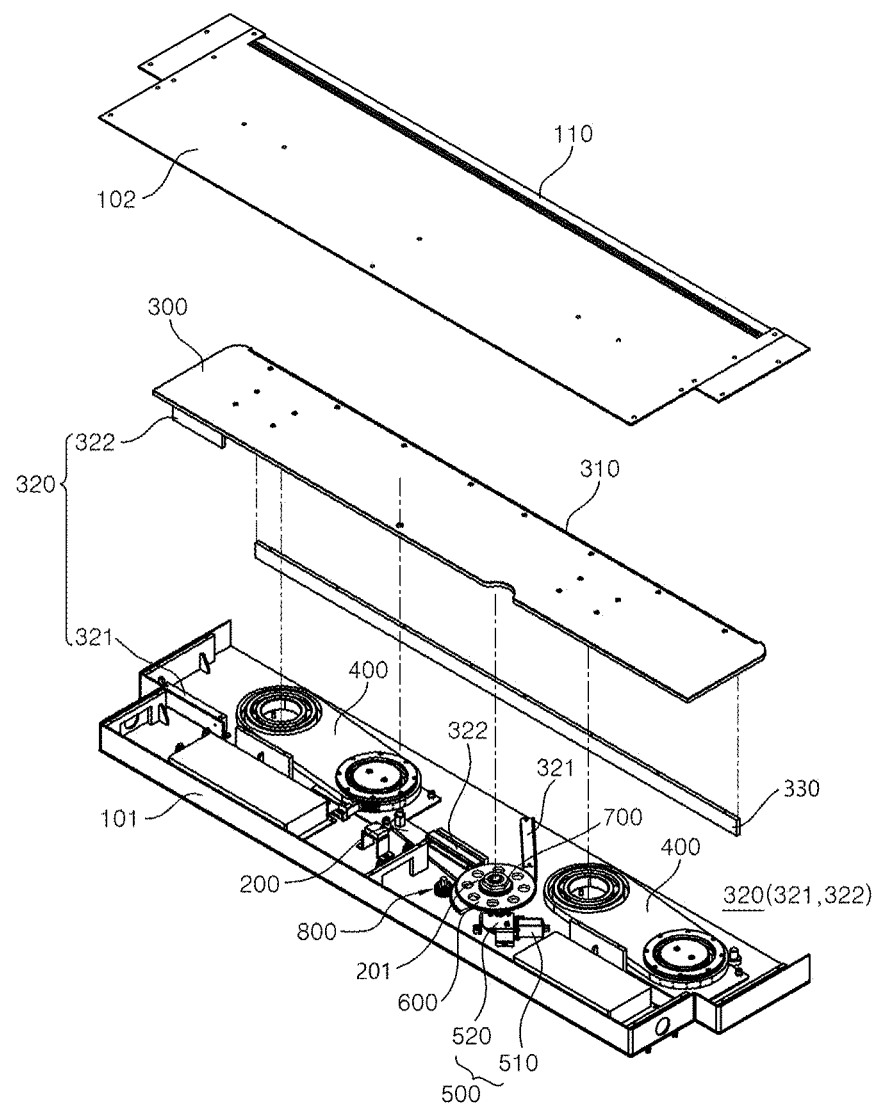

[FIG.3]
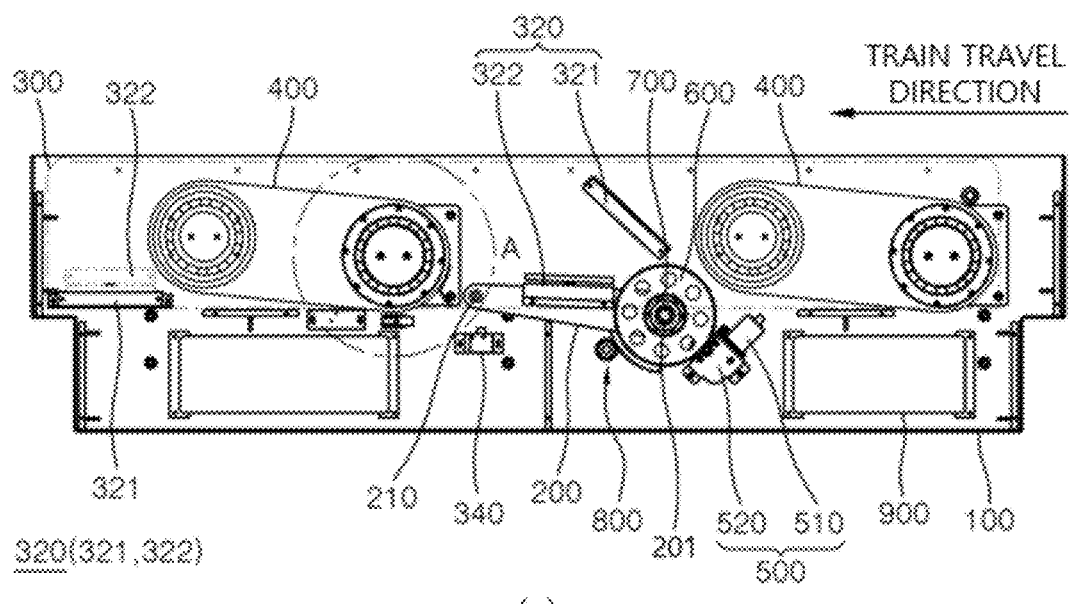
(a)
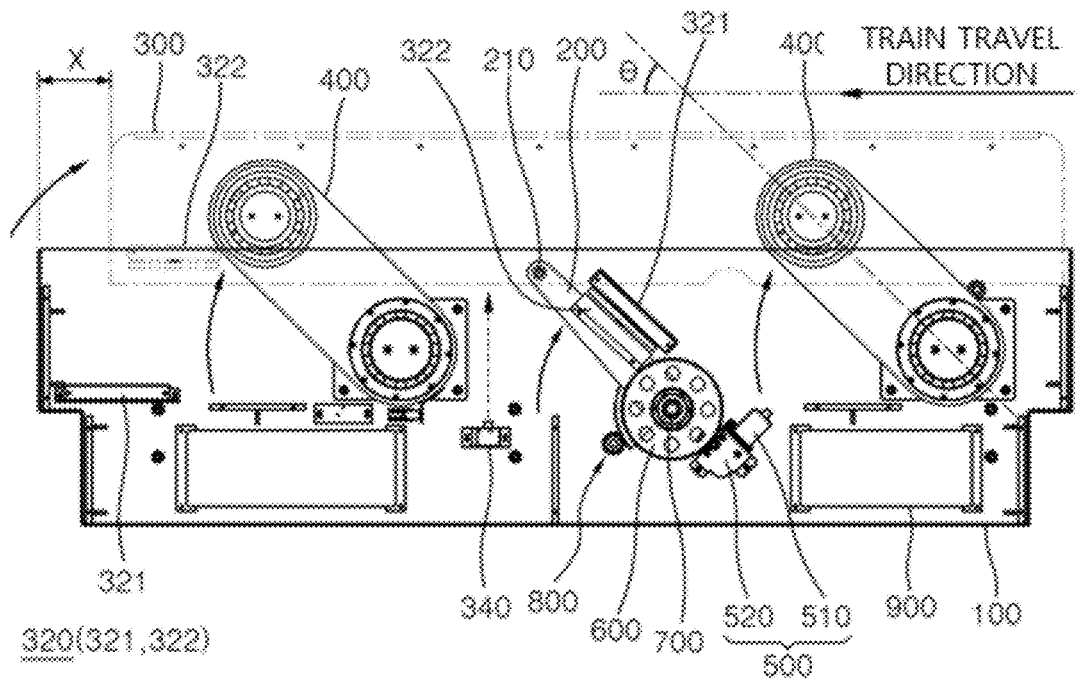
(b)

[FIG.4]
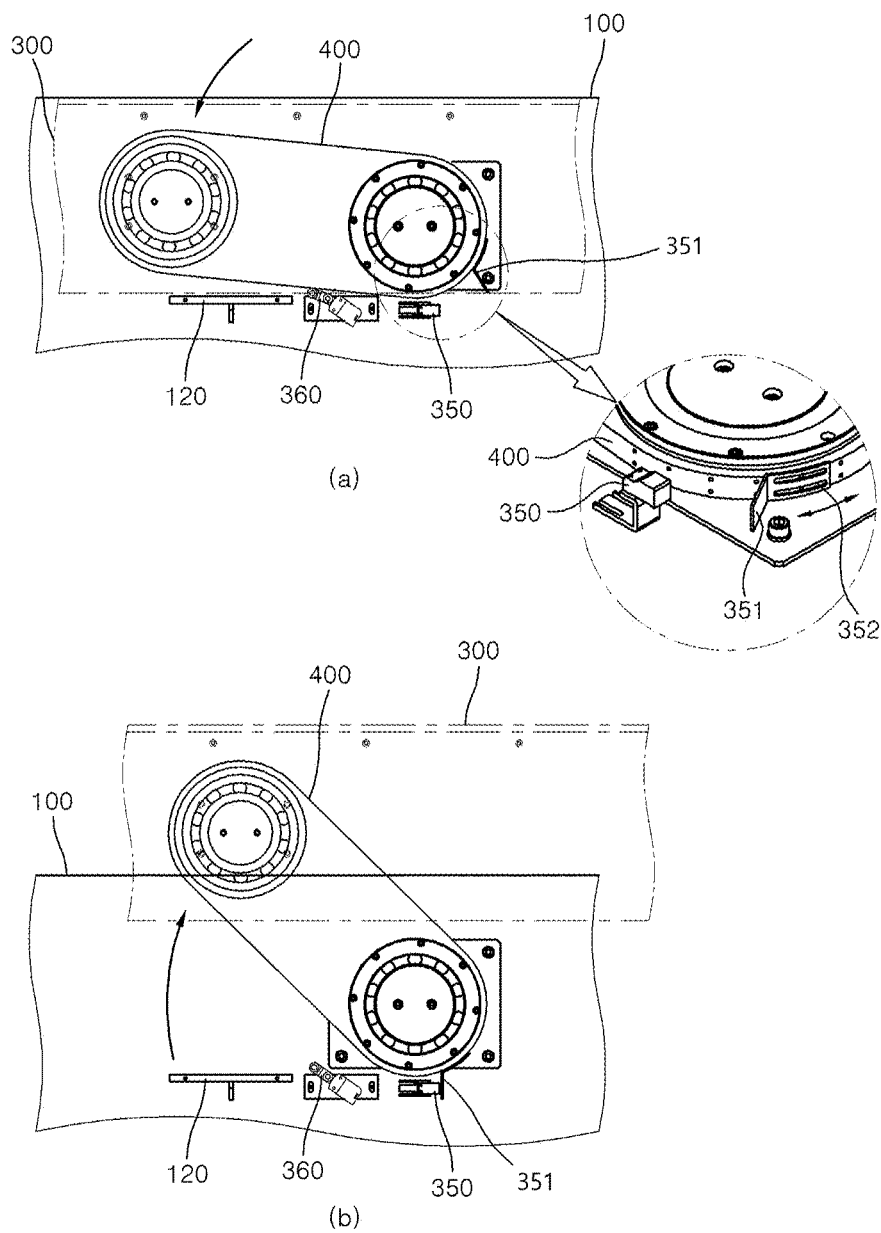

[FIG. 5]
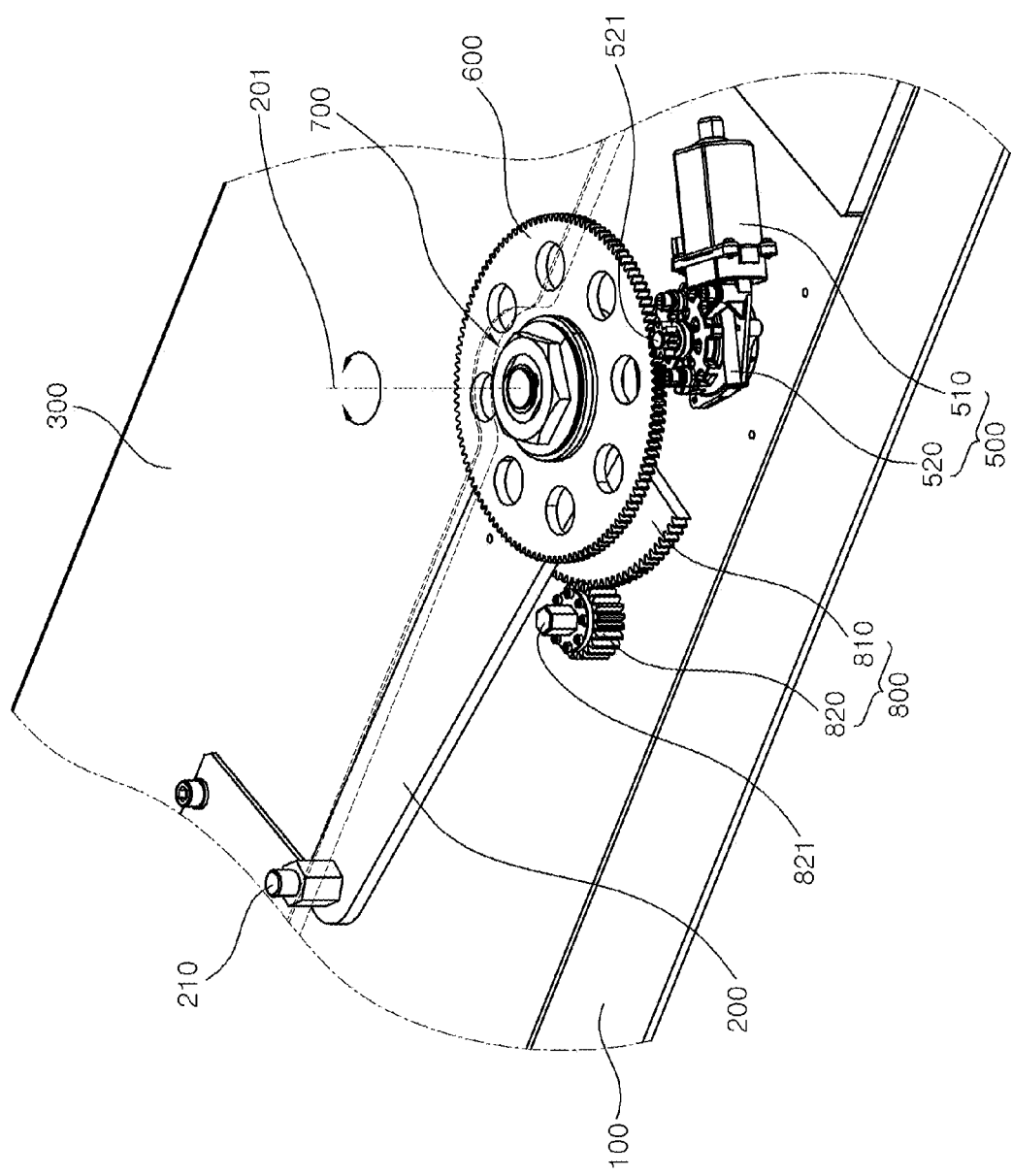

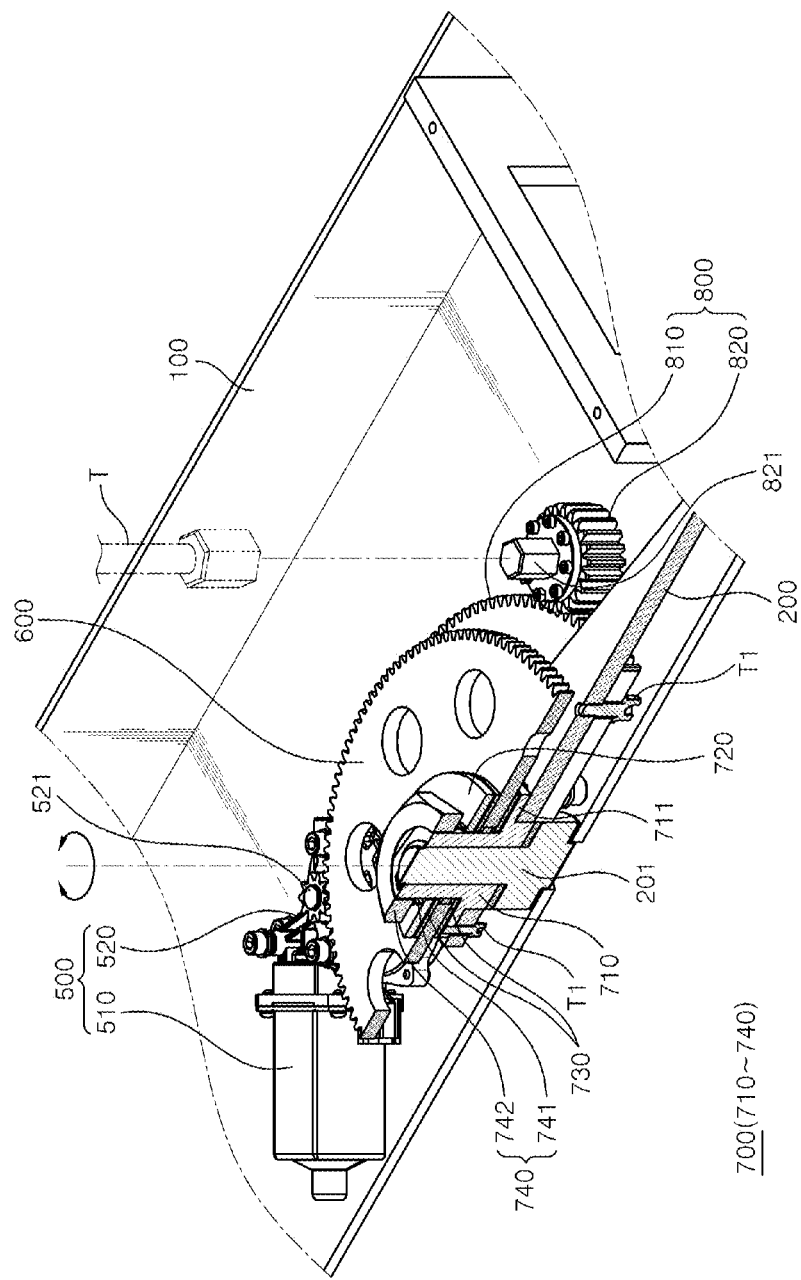
[FIG. 6]

SAFE FOOTHOLD APPARATUS FOR PLATFORM

CROSS-REFERENCE TO RELATED APPLICATIONS

This application is the national stage of International Patent Application No. PCT/KR2021/004652 filed on Apr. 13, 2021, which claims priority to Korean Patent Application No. 10-2020-0069812 filed in the Korean Intellectual Property Office on Jun. 9, 2020, the disclosures of which are incorporated by reference herein in their entireties.

TECHNICAL FIELD

The present disclosure relates to a safety footboard apparatus for a platform. More specifically, the present disclosure relates to a safety footboard apparatus for a platform in which a footboard plate moves along a curved rotation path and is protruded and retracted from the platform, thereby safely retracting the footboard plate into the platform due to an operation structure even if a collision with a train occurs in a state in which the footboard plate is protruded, and accordingly providing a safer boarding and disembarking environment by preventing the damage to the footboard plate and the train, the operating state of the footboard can be stably maintained by using a frictional contact module even in emergency situations, and through this, safety can be improved with a simple structure, the configuration of a manual manipulation module is simplified to facilitate manufacturing and installation work, and an entire device can be miniaturized and operational stability can be improved.

BACKGROUND

Generally, a platform of a certain height is installed in above-ground and subway stations for passengers to get on and off, and to prevent interference between a train entering the track and the platform, the platform is built to be located at a certain distance from the train while the train is stopped on the track. In particular, when the track and the platform are designed in a curved shape due to the nature of the station, the separation distance between the platform and the train becomes wider.

In this way, as there is a gap distance between the train and the platform, safety accidents such as passengers falling into occur due to the gap between the train and the platform when passengers get on and off, and in order to prevent this, various types of safety footboards are installed and used.

In an initial stage, these platform safety footboards were made in the form of being simply installed to be fixedly protruded at the front end of the platform, but in those products, there is a limit to minimizing the separation distance from the train and therefore recently it is installed in the form of protruding toward the train and retracting from the front end of the platform.

Conventional general platform safety footboards are configured in such a way that a separate footboard plate is reciprocally moved in a straight line and protruded or retracted from the platform, or a footboard plate rotates about a horizontal axis and is protruded or folded from the platform.

In these operation types, the protrusion and retraction of the footboard plate must be performed accurately in conjunction with the entry and exit of the train, but if the footboard plate does not operate appropriately due to a power outage or signal error, etc., for example, if the footboard plate remains protruded while the train departs from the platform, or if the footplate remains protruded even after the train departs from the platform, the footplate collides with the departing train or collides with a subsequently entering train, and in this case, not only the train is damaged, but also the footboard plate is broken, and in the process, there is a problem such as causing injuries to passengers waiting around.

SUMMARY

Technical Problem

The present disclosure is invented to solve problems in conventional technique, and the purpose of the present disclosure is for providing a safety footboard apparatus for a platform in which a footboard plate moves along a curved rotation path and is protruded and retracted from the platform, thereby safely retracting the footboard plate into the platform due to an operation structure even if a collision with a train occurs in a state in which the footboard plate is protruded, and accordingly providing a safer boarding and disembarking environment by preventing the damage to the footboard plate and the train.

Another purpose of the present disclosure is for providing a safety footboard apparatus for a platform in which, by retracting a footboard plate when external force which is more than or equal to a predetermined frictional resistance is applied to the footboard plate, the operational state of the footboard plate can be stably maintained in a normal situation, when an accident such as a collision with a train occurs, the footboard plate is retracted by the collision, thereby preventing a secondary accident, and in the process of retraction by the external force, a stable operating structure can be maintained without damage or resetting of an actuator and other parts.

Still another purpose of the present disclosure is for providing a safety footboard apparatus for a platform in which the operating state of the footboard can be stably maintained by using a frictional contact module even in emergency situations, and through this, safety can be improved with a simple structure.

Still another purpose of the present disclosure is for providing a safety footboard apparatus for a platform in which the configuration of a manual manipulation module is simplified to facilitate manufacturing and installation work, and an entire device can be miniaturized and operational stability can be improved.

Solution to Problem

The present disclosure may provide a safety footboard apparatus for a platform, wherein the safety footboard apparatus is installed to the platform to be capable of protruding to reduce a separation distance between a train and the platform, the safety footboard apparatus comprising: a base frame installed to the platform, wherein an accommodation space is formed inside the base frame; an operation arm, wherein one end portion of the operation arm is mounted inside the base frame rotatably around a vertical rotation axis; a footboard plate rotatably coupled to an other end portion of the operation arm so that the footboard plate is movable along a curved rotation path in a direction of being protruded or retracted from the base frame according to rotation of the operation arm; a rotatable link plate, wherein both end portions of the rotatable link plate are rotatably coupled to the base frame and the footboard plate, respectively, such that the rotatable link plate supports and guides the footboard plate; and an actuator comprising: a drive motor, and a power transfer means having an input portion connected to a motor axis of the drive motor and an output portion coupled to the operation arm so that the power transfer means performs rotation to transfer driving force of the drive motor to the operation arm, wherein when external force is input through the output portion, a rotation stop state is maintained not to perform power transfer, wherein: a driving wheel is coupled to the rotation axis of the operation arm to be connected to the output portion of the power transfer means, the operation arm and the driving wheel are arranged to be mutually frictionally contacted through a frictional contact module, if the driving force of the drive motor is transferred to the driving wheel through the power transfer means, the driving wheel and the operation arm rotate simultaneously by mutual frictional force to protrude or retract the footboard plate, if the external force greater than or equal to a reference number is applied to the footboard plate in a state in which the footboard plate is protruded, the operation arm rotates by counteracting frictional force with the driving wheel in a state in which rotation of the driving wheel is restrained by the power transfer means, and the footboard plate is retracted.

At this time, the power transfer means may comprise a worm gear having an input portion connected to the motor axis of the drive motor and an output portion connected to the driving wheel.

Additionally, the frictional contact module may comprise: a rotation shaft having a hollow cylindrical shape and insertedly coupled to the rotation axis of the operation arm, wherein a flange portion is protrudingly formed at an outer circumferential surface of the rotation shaft so that the driving wheel is seatedly coupled to an upper surface of the rotation shaft; a press body penetratingly coupled to the rotation shaft to downwardly press the driving wheel; and an elastic press module configured to downwardly elastically press the press body so that the driving wheel is closely contacted to the flange portion, the driving wheel may rotate together with the rotation shaft by frictional force with the flange portion, and the operation arm may be coupled to a lower surface of the flange portion to be rotated integrally with the rotation shaft.

Further, friction pads may be mounted to an upper surface of the flange portion and a lower surface of the press body, respectively, to frictionally contact the driving wheel.

In addition, the elastic press module may be formed to be capable of adjusting elastically pressing force to the press body.

Additionally, the elastic press module may comprise: an elastic material disposed above the press body to apply downward elastic force to the press body; and an elastic adjustment nut screwed at an upper end portion of the rotation shaft to adjust an elastic compression amount of the elastic material according to upward and/or downward movement.

Further, the safety footboard apparatus for the platform may further comprise a manual manipulation module configured to rotatingly move the footboard plate to protruding and retracting the footboard plate according to manipulation force of a user, and the manual manipulation module may be configured to transfer the manipulation force of the user to the operation arm, and the operation arm may rotate by counteracting the frictional force with the driving wheel by the manipulation force of the user through the manual manipulation module.

In addition, the manual manipulation module may comprise: a manual manipulation wheel coupled to the operation arm to be rotated integrally together with the operation arm and the rotation shaft, wherein gear teeth are formed at an outer circumferential surface of the manual manipulation wheel; and a manual manipulation gear rotatably coupled to the base frame to be engaged with the gear teeth of the manual manipulation wheel, and a manipulation protrusion may be formed at the manual manipulation gear and protrudes in a rotation axis direction for rotation manipulation by the user.

Additionally, the operation arm may be formed to be disposed in a direction of intersecting obliquely with respect to a direction of travel of the train in a state in which the footboard plate is operated to be protruded, and the rotatable link plate may be disposed parallel to the operation arm on both sides of the rotation axis of the operation arm.

Further, a cover plate formed to be elongated along a direction of travel of the train may be coupled to a lower surface of a protruded end portion of the footboard plate, and the cover plate may be formed to cover at least a partial area of one open side of the base frame in a state in which the footboard plate is retracted.

In addition, the safety footboard apparatus for the platform may further comprise a footboard holder device configured to restrain movement of the footboard plate by electric magnetic force in a state in which the footboard plate is protruded and retracted.

Additionally, a distance measurement sensor configured to measure a protruded distance of the footboard plate may be mounted to the base frame.

Further, a protrusion detection sensor and a retraction detection sensor configured to detect a protrusion state and a retraction state of the footboard plate may be mounted to the base frame, the protrusion detection sensor may be configured to be activated by being pressed by a detection bracket coupled to one side of the rotatable link plate in a state in which the footboard plate is completely protruded, the retraction detection sensor may be configured to be activated by being pressed by a side surface of the rotatable link plate in a state in which the footboard plate is completely retracted, and the detection bracket may be movably coupled to one side surface of the rotatable link plate.

Advantageous Effects of Invention

According to the present disclosure, there are effects in which a footboard plate moves along a curved rotation path and is protruded and retracted from the platform, thereby safely retracting the footboard plate into the platform due to an operation structure even if a collision with a train occurs in a state in which the footboard plate is protruded, and accordingly providing a safer boarding and disembarking environment by preventing the damage to the footboard plate and the train.

Additionally, there are effects in which, by retracting a footboard plate when external force which is more than or equal to a predetermined frictional resistance is applied to the footboard plate, the operational state of the footboard plate can be stably maintained in a normal situation, when an accident such as a collision with a train occurs, the footboard plate is retracted by the collision, thereby preventing a secondary accident, and in the process of retraction by the external force, a stable operating structure can be maintained without damage or resetting of an actuator and other parts.

Further, there are effects in which the operating state of the footboard can be stably maintained by using a frictional contact module even in emergency situations, and through this, safety can be improved with a simple structure.

In addition, there are effects in which the configuration of a manual manipulation module is simplified to facilitate manufacturing and installation work, and an entire device can be miniaturized and operational stability can be improved.

BRIEF DESCRIPTION OF THE DRAWINGS

FIG. 1 is a perspective view of schematically showing an installation structure of a safety footboard apparatus for a platform according to an embodiment of the present disclosure, FIG. 2 is a partially exploded perspective view of schematically showing configuration of a safety footboard apparatus for a platform according to an embodiment of the present disclosure, FIG. 3 is a view of schematically illustrating an operating state of a safety footboard apparatus of a platform according to an embodiment of the present disclosure, FIG. 4 is a view of schematically showing configuration of a sensor for sensing an operating state of a safety footboard apparatus of a platform according to an embodiment of the present disclosure, FIG. 5 is an enlarged perspective view of configuration related to an actuator of a safety footboard apparatus for a platform according to an embodiment of the present disclosure, FIG. 6 is a cross-sectional view of configuration related to an actuator of a safety footboard apparatus for a platform according to an embodiment of the present disclosure.

DETAILED DESCRIPTION OF EMBODIMENTS

Hereinafter, embodiments of the present disclosure will be described in detail with reference to the accompanying drawings. Throughout this document, reference should be made to the drawings, in which the same reference numerals and symbols will be used to designate the same or like components. Additionally, in the following description of the present disclosure, detailed descriptions of known functions and components incorporated herein will be omitted in the case that the subject matter of the present disclosure may be rendered unclear thereby.

FIG. 1 is a perspective view of schematically showing an installation structure of a safety footboard apparatus for a platform according to an embodiment of the present disclosure, FIG. 2 is a partially exploded perspective view of schematically showing configuration of a safety footboard apparatus for a platform according to an embodiment of the present disclosure, FIG. 3 is a view of schematically illustrating an operating state of a safety footboard apparatus of a platform according to an embodiment of the present disclosure, and FIG. 4 is a view of schematically showing configuration of a sensor for sensing an operating state of a safety footboard apparatus of a platform according to an embodiment of the present disclosure.

A safety footboard apparatus for a platform according to an embodiment of the present disclosure may be a device which is installed on a platform to be capable of protruding so that a separation distance between the platform and a train can be reduced, and includes a base frame (100), an operation arm (200), and a footboard plate (300), a rotatable link plate (400) and an actuator (500).

The base frame (100) is installed to the platform (10) in the form of an accommodation space formed therein, and is formed in a structure in which one surface of the base frame (100) facing the train is open. As shown in FIG. 2, the base frame (100) can be formed in a structure in which a lower base (101) having an upper surface and one side surface which are open is fixedly mounted to the platform, and a separate upper base (102) is coupled to the upper surface of the lower base (101). In a state in which a plurality of components are disposed in the inner space of the lower base (101), the upper base (102) is separatably coupled to the upper surface of the lower base (101). The upper base (102) is a portion that is exposed to the platform and is a portion that passengers step on, and an anti-slip pad (110) for preventing slipping may be coupled to the end portion facing the train. A controller (900) capable of controlling the operation of the actuator (500) may be mounted in the inner space of the base frame (100).

The operation arm (200) has a flat plate shape and one end portion of the operation arm (200) is mounted inside the base frame (100) to be rotatable around a vertical rotation axis (201). The footboard plate (300) has a flat plate shape elongated in one direction, one side end of the footboard plate (300) in the width direction is rotatably coupled to the other end of the operation arm (200), and the footboard plate (300) rotates along a curved rotation path in the direction of protruding or retracting from the base frame 100 according to the rotation of the operation arm (200). The footboard plate (300) is rotatably coupled to the operation arm (200) through a connection pin (210).

Both end portions of the rotatable link plate (400) are rotatably coupled to the base frame (100) and the footboard plate (300), respectively, to support and guide the footboard plate (300). These rotatable link plates (400) are arranged at both sides of the operation arm (200), respectively, to support and guide footboard plate (300). That is, the rotatable link plate (400) has one end coupled to the base frame (100) and the other end coupled to the footboard plate (300), and the rotatable link plate (400) guides the footboard plate (300) such that the footboard plate (300) rotates in a parallel state during the rotation of the footboard plate (300) caused by the rotation of the operation arm (200), and at the same time supports the footboard plate (300) in a state in which the footboard plate (300) protrudes.

The actuator (500) is configured to rotatingly drive the operation arm (200), and is configured to comprise a drive motor (510) operated by receiving power, and a power transmission means (520) that is connected to a motor shaft of the drive motor (510) and transmits a driving force to the operation arm (200).

When the actuator (500) operates according to this structure, the operation arm (200) rotates around the rotational axis (201), and the footboard plate (300) coupled to the operation arm (200) rotatingly moves along a curved rotation path and protrudes or retracts from the base frame (100).

For example, in the state in which the footboard plate (300) is retracted as shown in (a) of FIG. 3, if the operation arm (200) is rotated clockwise at a certain angle by the actuator (500) as shown in (b) of FIG. 3, the footboard plate (300) rotates clockwise along a curved rotation path and protrudes forward from the base frame (100). At this time, because one end of two rotatable link plates (400) is coupled to the footboard plate (300), the footboard plate (300) is guided by two rotatable link plates (400), rotates in a parallel state, and protrudes from the base frame (100).

As the footboard plate (300) is protruded in this way, the distance between the platform (10) and the train is reduced, and through this, safety accidents such as falling the foot into the gap between the platform (10) and the train when passengers get on and off are prevented. At this time, since the footboard plate (300) is supported by two rotatable link plates (400) in a state in which the footboard plate (300) is protruded, a stable support structure can be maintained even when passengers' load act on the footboard plate (300) when the passengers get on and off.

According to this operation structure, the protruded distance of the footboard plate (300) is determined according to the rotation angle (θ) of the operation arm (200), and in one embodiment of the present disclosure, the rotation angle (θ) of the operation arm (200) can be set such that the operation arm (200) is arranged in a direction (at an acute angle) obliquely intersecting with the moving direction of the train in a state in which the footboard plate (300) is protruded. For example, the rotation angle (θ) of the operation arm (200) may be set to 45°. In this case, the rotatable link plate (400) may be mounted to be disposed parallel to the operation arm (200).

In this way, by setting the rotation angle (θ) of the operation arm (200) to an acute angle state, the lateral direction (train traveling direction) movement distance (X) of the footboard plate (300) can be reduced for the same protruded distance of the footboard plate (300) when the rotational movement of the footboard plate (300) is operated, and accordingly, the lateral direction (train traveling direction) length of the base frame (100) receiving the footboard plate (300) can be reduced. Therefore, the overall size can be minimized in order to achieve a compact installation structure.

In the safety footboard apparatus for the platform according to an embodiment of the present disclosure, because the footboard plate (300) is protruded in such a way in which the footboard plate (300) is protruded according to the rotation of the operation arm (200) along a curved rotation path, if an external force acts in the direction of entry of the train in a state in which the footboard plate (300) is protruded, the footboard plate (300) can rotate and move in the opposite direction together with the operation arm (200) and can be retracted, thereby preventing safety accidents caused by collision with the train.

That is, as described in the section of Background, even if the train enters and collides with the footboard (300), which is maintained in a protruded state, due to power cut off or signal error, as the footboard (300) is again rotatably moved by the external force generated in the process of colliding with the train and is retracted into the inside of the base frame (100), secondary safety accidents such as damage to the footboard plate (300) or damage to the train can be prevented.

In this way, when an external force equal to or greater than a reference value acts on the footboard plate (300), the footboard plate (300) according to an embodiment of the present disclosure is forcedly rotated in the direction in which the footboard plate (300) is retracted, and in this case, only the footboard plate (300) is simply moved without damage due to reverse rotation of the actuator (500). To this end, a separate frictional contact module (700) is provided, and a related configuration will be described hereinafter.

First, the power transmission means (520) of the actuator (500) has an input portion connected to the motor shaft of the drive motor (510) and an output portion connected to the operation arm (200) to transfer the driving force of the drive motor (510) to the operation arm (200) in order for rotational drive, and when an external force is input through the output portion, a rotation stop state is maintained so that the power transmission is not performed. This power transmission means (520) may be configured in a form including, for example, a worm gear. One side end of a worm shaft may be configured to be connected to the motor shaft and the rotation shaft of the worm wheel may be configured to be connected to the operation arm (200), and when a rotational force acts on the worm shaft, the worm wheel rotates at the same time, but when the rotational force acts on the worm wheel, due to its structure, the worm shaft does not rotate and the worm wheel and the worm shaft are maintained in a rotation stop state.

A separate driving wheel (600) is coupled to the rotation shaft (201) of the operation arm (200) to be connected to the output portion of the power transmission means (520) (for example, a worm wheel of a worm gear). Gear teeth are formed on the outer circumferential surface of the driving wheel (600), an output driving wheel (521) may be coupled to the output portion of the power transmission means (520) to be engaged with the gear teeth of the driving wheel (600), and the output driving wheel (521) may be coupled coaxially with the rotation axis of the worm wheel.

At this time, the operation arm (200) and the driving wheel (600) are arranged to frictionally contact each other through a separate frictional contact module (700) and rotate simultaneously by mutual frictional force by the frictional contact module (700). Accordingly, when the driving force of the drive motor (510) is transmitted to the driving wheel (600) through the power transmission means (520), the driving wheel (600) and the operation arm (200) are rotated simultaneously by mutual frictional force, thereby protruding or retracting to the footboard plate (300), and when an external force greater than or equal to a reference value acts on the footboard plate (300) in a state in which the footboard plate (300) is protruded, the operation arm (200) rotates by the driving wheel (600) in a state in which the driving wheel (600) is rotationally constrained by the power transmission means (520), and the footboard plate (300) is retracted.

Therefore, when the driving force of the drive motor (510) is transmitted to the driving wheel (600) through the power transmission means (520), the driving wheel (600) is rotated, and the operation arm (200) is rotated together with the driving wheel (600) by the frictional force with the driving wheel (600) generated by the frictional contact module (700). By the rotation of the operation arm (200), the footboard plate (300) rotates along a curved rotation path and is protruded or retracted from the base frame (100), Unlike this, when an external rotational force (a separate external rotational force not a driving force of the drive motor (510)) is applied, the driving wheel (600) is coupled to the output portion of the power transmission means (520) formed of a worm gear, and therefore as described above, due to the structure of the power transmission unit (520), power transmission is not performed and the driving wheel (600) is maintained in the rotation stop state. Therefore, when an external force is applied to the footboard plate (300), it is transmitted to the operation arm (200) by a rotational force, and the same rotational force is transmitted to the driving wheel (600) by frictional force, and because the driving wheel (600) is connected to the output portion of the power transmission means (520) and maintains the rotation stop state, when the external force applied to the footboard plate (300) is greater than or equal to a reference value, the driving wheel (600) counteracts the frictional force with the driving wheel (600) in a state that the rotation of the driving wheel (600) is stopped, and rotates.

When an external rotational force (for example, rotational force caused by the collision with the train) greater than or equal to a reference value is applied to the footboard plate (300) in a state in which the footboard plate (300) is protruded from the base frame (100), the operation arm (200) counteracts the frictional force with the driving wheel (600) and rotates, thereby retracting the footboard plate (300). In this process, reverse rotation of the actuator (500) does not occur, so the damage or resetting operation of the actuator (500) is unnecessary, and only the footboard plate (300) is stably retracted regardless of other parts.

Therefore, even if the footboard plate (300) collides with the train, the footboard plate (300) is stably retracted, thereby preventing a secondary safety accident, and in this process, the damage to the actuator (500) due to the reverse rotation of the actuator (500) can be also prevented, thereby maintaining a more stable structure.

The safety footboard apparatus for the platform according to an embodiment of the present disclosure may further include a manual manipulation module (800) capable of manually operating the footboard plate (300), and the detailed configurations of the manual manipulation module (800) and the frictional contact module (700) will be described later with reference to FIGS. 5 and 6.

According to the structures described above, only when external force lower than or equal to a reference number is applied to the footboard plate (300), the footboard plate (300) and the operation arm (200) are not rotated and are fixed, and in one embodiment of the present disclosure, a separate footboard holder device (320) is provided to restrain the movement of the footboard plate (300) in a state in which the footboard plate (300) is protruded or retracted.

The footboard holder device (320) operates to restrain the movement of the footboard plate (300) by electromagnetic force, and is configured to include a magnetic body (322) made of a magnetic material, and an electromagnetic body (321) fixing the magnetic body (322) by receiving power and generating electromagnetic force. As shown in FIG. 3, the magnetic body (322) may be coupled to one side of the footboard plate (300) and one side of the operation arm (200), and the electromagnetic body (321) is arranged at one side and the other side of the base frame (100) to correspond to the magnetic body (322). One of two electromagnetic bodies (321) is placed in proximity or in contact with the magnetic body (322) coupled to the footboard plate (300) in a state in which the footboard plate (300) is retracted in order to fix the retracted state of the footboard plate (300), and the other one of two electromagnetic bodies (321) is disposed in proximity or contact position with the magnetic body (322) coupled to the operation arm (200) in a state in which the footboard plate (300) protrudes in order to fix the protruded state of the footboard plate (300). In addition, a separate stopper block (120) capable of limiting the retraced degree of the footboard plate (300) may be mounted on the base frame (100).

Additionally, a protrusion detection sensor (350) and a retraction detection sensor (360) capable of detecting protrusion and retraction states of the footboard plate (300) may be mounted to the base frame (100).

As illustrated in (a) of FIG. 4, the retraction detection sensor (360) may be formed to operate by being pressed by the side of the rotatable link plate (400) in a state in which the footboard plate (300) is retracted. As shown in (b) of FIG. 4, the protrusion detection sensor (350) may be formed to operate by being pressed by a detection bracket (351) coupled to one side surface of the rotatable link plate (400) in a state in which the footboard plate (300) is protruded. At this time, one end portion of the detection bracket (351) is coupled to the side surface of the rotatable link plate (400) and the bent other end of the detection bracket (352) is configured to press the protrusion detection sensor (350). In this case, a slot hole (352) is formed at one end portion of the detection bracket (351) along the circumferential direction of the rotatable link plate (400), and the detection bracket (351) can be movably coupled to one side surface of the rotatable link plate (400) through the slot hole (352).

In general, the protruded distance of the FFF may be adjusted differently depending on the situation of the platform, and when the protruded distance of the footboard plate (300) is adjusted, the rotatable link plate (400) is also adjusted together with the operation arm (200). In this case, by adjusting the mounting position of the detection bracket (351), the protrusion operation state of the footboard plate (300) according to the corresponding protrusion distance can be accurately detected.

Apart from this, a distance measurement sensor (340) capable of independently measuring the protruded distance of the footboard plate (300) may be mounted to the base frame (100), and various distance sensors such as an ultrasonic sensor, an optical sensor and so on may be applied to the distance measurement sensor (340) with a method of detecting a distance from one side of the base frame (100) to a protrusion rear end surface of the footboard plate (300).

On the other hand, the footboard plate (300) is supported by the rotatable link plate (400) in the protruded state as described above, and when a concentrated load generated by passengers or the like occurs when getting on or off the passengers, sagging deformation may occur in the footboard plate (300), and therefore a separate cover plate (330) can be coupled to the footboard plate (300) in order to prevent such sagging deformation and reinforce the strength of the footboard plate (300).

The cover plate (330) is arranged on the lower surface of the protrusion end portion of the footboard plate (300) to be formed to be elongated along the traveling direction of the railroad car, and in a state in which the footboard plate (300) is inserted into the base frame (100), the footboard plate (300) may be formed to cover at least a portion of one open surface of the base frame (100).

Through this structure, it is possible to minimize sagging deformation by reinforcing the footboard plate (300), and in the retracted state not a protrusion operation state of the footboard plate (300) (maintaining the retracted state for most of the time), prevent inflow of foreign substances or moisture into the inner space of the base frame (100) by covering the open side surface of the base frame (100), thereby improving operational stability and durability.

Meanwhile, when the concentrated load on the footboard plate (300) occurs, deflection deformation in the rotatable link plate (400) supporting the footboard plate (300) independently of own deflection deformation of the footboard plate (300) itself may occur. In order to prevent the rotatable link plate (400) from being deflected beyond a permissible value, a deflection limiting support (not shown) disposed to be spaced apart from the lower surface of the rotatable link plate (400) at a predetermined distance may be included in the base frame (100). The deflection limiting support may be mounted to be protruded from the inner bottom surface of the base frame (100) in a structure having a curved path along the rotational curved path of the rotatable link plate (400). Therefore, even if the deflection deformation of the rotatable link plate (400) occurs, the rotatable link plate (400) is supported by the deflection limiting support located at the lower portion after a certain amount of the deflection deformation, and thus the deflection deformation beyond the separation distance from the deflection limiting support is prevented. At this time, a separate gap adjusting bolt (not shown) capable of contacting the deflection limiting support when the sagging deformation of the rotatable link plate (400) occurs may vertically penetrate and be coupled to the rotatable link plate (400), and the allowable amount of deflection of the rotatable link plate (400) may be adjusted by adjusting the height of the penetration of the gap adjusting bolt.

In addition, an obstacle detection sensor (310) capable of detecting an obstacle may be mounted to the protruded end of the footboard plate (300). The obstacle detection sensor (310) may be applied with a pressure sensor or the like, and when a passenger's foot falls into or other foreign object exists between the platform and the train, the obstacle detection sensor (310) detects it and controls an operation to stop the protrusion operation state of the footboard plate (300).

Next, configurations of the frictional contact module (700) and the manual operation module (800) according to an embodiment of the present invention will be described.

FIG. 5 is an enlarged perspective view of configuration related to an actuator of a safety footboard apparatus for a platform according to an embodiment of the present disclosure, and FIG. 6 is a cross-sectional view of configuration related to an actuator of a safety footboard apparatus for a platform according to an embodiment of the present disclosure.

The frictional contact module (700) is coupled to the rotation shaft (201) of the operation arm (200) so that the operation arm (200) and the driving wheel (600) are in frictional contact with each other, and is configured to comprise a rotation shaft (710) having a hollow cylindrical shape and insertedly coupled to the rotation axis (201) of the operation arm (200), wherein a flange portion (711) is protrudingly formed at an outer circumferential surface of the rotation shaft (710) so that the driving wheel (600) is seatedly coupled to an upper surface of the rotation shaft (710), a press body (720) penetratingly coupled to the rotation shaft (710) to downwardly press the driving wheel (600), and an elastic press module (740) configured to downwardly elastically press the press body (720) so that the driving wheel (600) is closely contacted to the flange portion (711). The driving wheel (600) rotates together with the rotation shaft (710) by frictional force with the flange portion (711), and the operation arm (200) is coupled to the lower surface of the flange portion (711) through a coupling bolt (T1) to be configured to rotate integrally with the rotation shaft (710). At this time, friction pads (730) are mounted on the upper surface of the flange portion (711) and the lower surface of the press body (720), respectively to frictionally contact the driving wheel (600).

According to this configuration, when the driving force is transmitted to the driving wheel (600) through the power transmission means (520) of the actuator (500), the driving wheel (600) rotates, by the frictional force with the driving wheel (600) the rotation shaft (710) integrally rotates together, and the operation arm (200) coupled to the rotation shaft (710) also rotates integrally together. As the operation arm (200) rotates, the footboard plate (300) is protruded or retracted.

Unlike this, when an external force acts on the footboard plate (300) and is transmitted as rotational force to the operation arm (200), this rotational force is transmitted to the rotation shaft (710) coupled with the operation arm (200), and is also transmitted to the driving wheel (600) in frictional contact with the rotation shaft (710). However, because the driving wheel (600) is connected to the output portion or end of the power transmission means (520), the driving wheel (600) cannot rotate and remains rotationally constrained. Therefore, if the rotational force acting on the operation arm (200) is greater than or equal to the frictional force with the driving wheel (600), only the operation arm (200) rotates against the frictional force while the rotation of the driving wheel (600) is restrained. That is, when an external force of more than or equal to a reference value (more than the frictional force with the driving wheel) acts on the footboard plate (300), only the footboard plate (300) and the operation arm (200) rotatingly move in a state in which the rotation of the driving wheel (600) is constrained. Therefore, when the footboard plate (300) collides with the train in a protruded state, the footboard plate (300) rotates and is retracted, thereby not occurring damage or deformation of other parts such as reverse rotation of the actuator (500).

Meanwhile, an elastic press module (740) which elastically presses the press body (720) downward is formed to be capable of adjusting the elastic pressing force to the press body (720). For example, it can be configured to include an elastic material or member (741) disposed above the press body (720) to apply a downward elastic force to the press body (720), and an elastic adjustment nut (742) screwed to the upper end portion of the rotation shaft (710) to adjust the amount of elastic compression of the elastic material or member (741) according to vertical movement. The elastic material or member (741) may be formed in the form of a coil spring or a plate spring.

According to this structure, when the elastic adjustment nut (742) is rotated and moved downward, the downward pressing force of the elastic material or member (741) increases, so that the frictional force between the press body (720) and the driving wheel (600) increases, and when the elastic adjustment nut (742) is rotated in the opposite direction to move upward, the downward pressing force of the elastic material or member (741) is decreased, so that the frictional force between the press body (720) and the driving wheel (600) is reduced.

On the other hand, the manual manipulation module (800) operates to rotatingly move the footboard plate (300) so that the footboard plate (300) is protruded and retracted by the manipulating force of the user in a specific situation such as a power cut off state, and such a manual manipulation module (800) is formed such that the manipulating force of the user can be transmitted to the operation arm (200), and the operation arm (200) is configured to rotate against the frictional force with the driving wheel (600) by the user's manipulating force through the manual operation module (800).

The manual manipulation module (800) is coupled to the operation arm (200) through a coupling bolt (T1) so as to integrally rotate together with the operation arm (200) and the manual manipulation module (800) is configured to include a manual manipulation wheel (810) in which gear teeth are formed on its outer circumferential surface, and a manual manipulation gear (820) rotatably coupled to the base frame (100) so as to be engaged with the gear teeth of the manual manipulation wheel (810), and a manipulation protrusion (821) may be formed at the manual manipulation gear (820) and protrudes in the direction of the rotational axis so that the user can manipulate to rotate it. The manipulation protrusion (821) is formed in a form to which a separate tool (T) can be coupled.

According to this configuration, when the user rotates the manual manipulation gear (820) through the tool (T), the manual manipulation wheel (810) and the operation arm (200) are integrally rotated, and the footboard plate (300) is rotatingly moved together with the operation arm 200 to be protruded or retracted. At this time, the driving wheel (600) is maintained in a state in which the rotation of the driving wheel (600) is restrained by the power transmission means (520), and the operation arm (200) rotates against the frictional force with the driving wheel (600) by the frictional contact module (700).

Therefore, a safety footboard apparatus of a platform according to an embodiment of the present disclosure can manually manipulate the footboard plate (300) with a simple structure, and can perform manual manipulation stably without damage or deformation of the actuator (500) and other parts during the manual manipulation.

The foregoing descriptions have been presented in order to explain certain principles of the present disclosure by way of example, and a person having ordinary skill in the art which the present disclosure relates could make various modifications and variations without departing from the essential features of the present disclosure. Accordingly, the foregoing embodiments disclosed in the present disclosure shall be interpreted as being illustrative, while not being limitative, of the principle and scope of the present disclosure. It should be understood that the scope of the present disclosure shall be defined by the Claims and all of their equivalents fall within the scope of the present disclosure.

What is claimed is:

1. A safety footboard apparatus for a platform, wherein the safety footboard apparatus is installed to the platform to be capable of protruding to reduce a separation distance between a train and the platform, the safety footboard apparatus comprising:
    a base frame installed to the platform, wherein an accommodation space is formed inside the base frame;
    an operation arm, wherein one end portion of the operation arm is mounted inside the base frame rotatably around a vertical rotation axis;
    a footboard plate rotatably coupled to an other end portion of the operation arm so that the footboard plate is movable along a curved rotation path in a direction of being protruded or retracted from the base frame according to rotation of the operation arm;
    a rotatable link plate, wherein both end portions of the rotatable link plate are rotatably coupled to the base frame and the footboard plate, respectively, such that the rotatable link plate supports and guides the footboard plate; and
    an actuator comprising:
    a drive motor, and
    a power transfer means having an input portion connected to a motor axis of the drive motor and an output portion coupled to the operation arm so that the power transfer means performs rotation to transfer driving force of the drive motor to the operation arm, wherein when external force is input through the output portion, a rotation stop state is maintained not to perform power transfer, wherein:
    a driving wheel is coupled to the rotation axis of the operation arm to be connected to the output portion of the power transfer means,
    the operation arm and the driving wheel are arranged to be mutually frictionally contacted through a frictional contact module,
    if the driving force of the drive motor is transferred to the driving wheel through the power transfer means, the driving wheel and the operation arm rotate simultaneously by mutual frictional force to protrude or retract the footboard plate,
    if the external force greater than or equal to a reference number is applied to the footboard plate in a state in which the footboard plate is protruded, the operation arm rotates by counteracting frictional force with the driving wheel in a state in which rotation of the driving wheel is restrained by the power transfer means, and the footboard plate is retracted; and wherein
    the frictional contact module comprises:
    a rotation shaft having a hollow cylindrical shape and insertedly coupled to the rotation axis of the operation arm, wherein a flange portion is protrudingly formed at an outer circumferential surface of the rotation shaft so that the driving wheel is seatedly coupled to an upper surface of the rotation shaft;
    a press body penetratingly coupled to the rotation shaft to downwardly press the driving wheel; and
    an elastic press module configured to downwardly elastically press the press body so that the driving wheel is closely contacted to the flange portion,
    wherein:
    the driving wheel rotates together with the rotation shaft by frictional force with the flange portion, and
    the operation arm is coupled to a lower surface of the flange portion to be rotated integrally with the rotation shaft.

2. The safety footboard apparatus for the platform according to claim 1, wherein the power transfer means comprises a worm gear having an input portion connected to the motor axis of the drive motor and an output portion connected to the driving wheel.

3. The safety footboard apparatus for the platform according to claim 1, wherein
    friction pads are mounted to an upper surface of the flange portion and a lower surface of the press body, respectively, to frictionally contact the driving wheel.

4. The safety footboard apparatus for the platform according to claim 1, wherein
    the elastic press module is formed to be capable of adjusting elastically pressing force to the press body.

5. The safety footboard apparatus for the platform according to claim 4, wherein the elastic press module comprises:
    an elastic material disposed above the press body to apply downward elastic force to the press body; and
    an elastic adjustment nut screwed at an upper end portion of the rotation shaft to adjust an elastic compression amount of the elastic material according to upward and/or downward movement.

6. The safety footboard apparatus for the platform according to claim 1,
    further comprising a manual manipulation module configured to rotatingly move the footboard plate to protruding and retracting the footboard plate according to manipulation force of a user, wherein:
    the manual manipulation module is configured to transfer the manipulation force of the user to the operation arm, and
    the operation arm rotates by counteracting the frictional force with the driving wheel by the manipulation force of the user through the manual manipulation module.

7. The safety footboard apparatus for the platform according to claim 6, wherein the manual manipulation module comprises:
    a manual manipulation wheel coupled to the operation arm to be rotated integrally together with the operation arm and the rotation shaft, wherein gear teeth are formed at an outer circumferential surface of the manual manipulation wheel; and a manual manipulation gear rotatably coupled to the base frame to be engaged with the gear teeth of the manual manipulation wheel, wherein a manipulation protrusion is formed at the manual manipulation gear and protrudes in a rotation axis direction for rotation manipulation by the user.

8. The safety footboard apparatus for the platform according to claim 1, wherein:

the operation arm is formed to be disposed in a direction of intersecting obliquely with respect to a direction of travel of the train in a state in which the footboard plate is operated to be protruded, and the rotatable link plate is disposed parallel to the operation arm on both sides of the rotation axis of the operation arm.

9. The safety footboard apparatus for the platform according to claim 1, wherein:

a cover plate formed to be elongated along a direction of travel of the train is coupled to a lower surface of a protruded end portion of the footboard plate, and the cover plate is formed to cover at least a partial area of one open side of the base frame in a state in which the footboard plate is retracted.

10. A safety footboard apparatus for a platform, wherein the safety footboard apparatus is installed to the platform to be capable of protruding to reduce a separation distance between a train and the platform, the safety footboard apparatus comprising:

a base frame installed to the platform, wherein an accommodation space is formed inside the base frame;

an operation arm, wherein one end portion of the operation arm is mounted inside the base frame rotatably around a vertical rotation axis;

a footboard plate rotatably coupled to an other end portion of the operation arm so that the footboard plate is movable along a curved rotation path in a direction of being protruded or retracted from the base frame according to rotation of the operation arm;

a rotatable link plate, wherein both end portions of the rotatable link plate are rotatably coupled to the base frame and the footboard plate, respectively, such that the rotatable link plate supports and guides the footboard plate; and an actuator comprising:

a drive motor, and a power transfer means having an input portion connected to a motor axis of the drive motor and an output portion coupled to the operation arm so that the power transfer means performs rotation to transfer driving force of the drive motor to the operation arm, wherein when external force is input through the output portion, a rotation stop state is maintained not to perform power transfer, wherein:

a driving wheel is coupled to the rotation axis of the operation arm to be connected to the output portion of the power transfer means, the operation arm and the driving wheel are arranged to be mutually frictionally contacted through a frictional contact module, if the driving force of the drive motor is transferred to the driving wheel through the power transfer means, the driving wheel and the operation arm rotate simultaneously by mutual frictional force to protrude or retract the footboard plate, if the external force greater than or equal to a reference number is applied to the footboard plate in a state in which the footboard plate is protruded, the operation arm rotates by counteracting frictional force with the driving wheel in a state in which rotation of the driving wheel is restrained by the power transfer means, and the footboard plate is retracted;

the safety footboard apparatus further comprising:

a footboard holder device configured to restrain movement of the footboard plate by electric magnetic force in a state in which the footboard plate is protruded and retracted.

11. A safety footboard apparatus for a platform, wherein the safety footboard apparatus is installed to the platform to be capable of protruding to reduce a separation distance between a train and the platform, the safety footboard apparatus comprising:

a base frame installed to the platform, wherein an accommodation space is formed inside the base frame;

an operation arm, wherein one end portion of the operation arm is mounted inside the base frame rotatably around a vertical rotation axis;

a footboard plate rotatably coupled to an other end portion of the operation arm so that the footboard plate is movable along a curved rotation path in a direction of being protruded or retracted from the base frame according to rotation of the operation arm;

a rotatable link plate, wherein both end portions of the rotatable link plate are rotatably coupled to the base frame and the footboard plate, respectively, such that the rotatable link plate supports and guides the footboard plate; and an actuator comprising:

a drive motor, and a power transfer means having an input portion connected to a motor axis of the drive motor and an output portion coupled to the operation arm so that the power transfer means performs rotation to transfer driving force of the drive motor to the operation arm, wherein when external force is input through the output portion, a rotation stop state is maintained not to perform power transfer, wherein:

a driving wheel is coupled to the rotation axis of the operation arm to be connected to the output portion of the power transfer means, the operation arm and the driving wheel are arranged to be mutually frictionally contacted through a frictional contact module, if the driving force of the drive motor is transferred to the driving wheel through the power transfer means, the driving wheel and the operation arm rotate simultaneously by mutual frictional force to protrude or retract the footboard plate, if the external force greater than or equal to a reference number is applied to the footboard plate in a state in which the footboard plate is protruded, the operation arm rotates by counteracting frictional force with the driving wheel in a state in which rotation of the driving wheel is restrained by the power transfer means, and the footboard plate is retracted;

wherein a distance measurement sensor configured to measure a protruded distance of the footboard plate is mounted to the base frame.

12. A safety footboard apparatus for a platform, wherein the safety footboard apparatus is installed to the platform to be capable of protruding to reduce a separation distance between a train and the platform, the safety footboard apparatus comprising:
- a base frame installed to the platform, wherein an accommodation space is formed inside the base frame;
- an operation arm, wherein one end portion of the operation arm is mounted inside the base frame rotatably around a vertical rotation axis;
- a footboard plate rotatably coupled to an other end portion of the operation arm so that the footboard plate is movable along a curved rotation path in a direction of being protruded or retracted from the base frame according to rotation of the operation arm;
- a rotatable link plate, wherein both end portions of the rotatable link plate are rotatably coupled to the base frame and the footboard plate, respectively, such that the rotatable link plate supports and guides the footboard plate; and
- an actuator comprising:
- a drive motor, and
- a power transfer means having an input portion connected to a motor axis of the drive motor and an output portion coupled to the operation arm so that the power transfer means performs rotation to transfer driving force of the drive motor to the operation arm, wherein when external force is input through the output portion, a rotation stop state is maintained not to perform power transfer, wherein:
- a driving wheel is coupled to the rotation axis of the operation arm to be connected to the output portion of the power transfer means,
- the operation arm and the driving wheel are arranged to be mutually frictionally contacted through a frictional contact module,
- if the driving force of the drive motor is transferred to the driving wheel through the power transfer means, the driving wheel and the operation arm rotate simultaneously by mutual frictional force to protrude or retract the footboard plate,
- if the external force greater than or equal to a reference number is applied to the footboard plate in a state in which the footboard plate is protruded, the operation arm rotates by counteracting frictional force with the driving wheel in a state in which rotation of the driving wheel is restrained by the power transfer means, and the footboard plate is retracted; wherein:
- a protrusion detection sensor and a retraction detection sensor configured to detect a protrusion state and a retraction state of the footboard plate are mounted to the base frame,
- the protrusion detection sensor is configured to be activated by being pressed by a detection bracket coupled to one side of the rotatable link plate in a state in which the footboard plate is completely protruded,
- the retraction detection sensor is configured to be activated by being pressed by a side surface of the rotatable link plate in a state in which the footboard plate is completely retracted, and
- the detection bracket is movably coupled to one side surface of the rotatable link plate.

* * * * *